(12) United States Patent
Mineo

(10) Patent No.: US 7,458,868 B2
(45) Date of Patent: Dec. 2, 2008

(54) SMALL PLANING BOAT

(75) Inventor: Shigeharu Mineo, Shizuoka-ken (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/511,970

(22) Filed: Aug. 29, 2006

(65) Prior Publication Data

US 2007/0059997 A1    Mar. 15, 2007

(30) Foreign Application Priority Data

Aug. 29, 2005    (JP) .............................. 2005-247767

(51) Int. Cl.
  *B63H 21/14*    (2006.01)
(52) U.S. Cl. .................................... 440/88 C
(58) Field of Classification Search ................ 440/88 C
  See application file for complete search history.

(56) References Cited

U.S. PATENT DOCUMENTS

| 1,871,662 | A | 8/1932 | Carrier |
|---|---|---|---|
| 1,876,948 | A | 9/1932 | Jahnke |
| 1,903,210 | A | 3/1933 | Carrier |
| 1,974,974 | A | 9/1934 | Puffer |
| 2,344,366 | A | 3/1944 | Prince |
| 2,366,365 | A | 1/1945 | Sorensen |
| 2,378,452 | A | 6/1945 | Vincent |
| 2,406,388 | A | 8/1946 | Larrecq |
| 2,523,588 | A | 9/1950 | Ormsby |
| 2,565,060 | A | 8/1951 | Beardsley et al. |
| 2,828,907 | A | 4/1958 | Oehrli |
| 2,847,186 | A | 4/1958 | Anderson et al. |

(Continued)

FOREIGN PATENT DOCUMENTS

EP    44348 A1    1/1982

(Continued)

OTHER PUBLICATIONS

Co-pending U.S. Appl. No. 10/866,384, filed Jun. 11, 2004. Now issued as US Patent No. 7247067. Title: Intake Manifold for Small Watercraft. Inventor: Mashiko. Our Ref. FS.20144US0A.

(Continued)

*Primary Examiner*—Stephen Avila
(74) *Attorney, Agent, or Firm*—Knobbe, Martens, Olson & Bear, LLP

(57) ABSTRACT

An air passage and a cooling water passage can be formed in an intercooler provided on a small planing boat. A cooling water inlet of a cooling water passage in the intercooler can be provided at the lower end of the intercooler. A cooling water outlet can be at the upper end of the intercooler. The intercooler can be vertically elongated and disposed at the front side of the engine. Further, a discharge port of a supercharger can be directed upwardly and an air inlet of the intercooler can be provided on the intercooler at the upper part. Furthermore, the intercooler, the supercharger and an intake manifold can be arranged such that when viewed in the lateral direction, the intercooler and supercharger overlap each other and when viewed in the longitudinal direction, the intercooler and intake manifold can also overlap each other. Moreover, the intercooler can be of a two-pass type.

9 Claims, 8 Drawing Sheets

U.S. PATENT DOCUMENTS

| | | | |
|---|---|---|---|
| 2,973,894 A | 3/1961 | Kimball et al. | |
| 3,554,322 A | 1/1971 | Deutschmann et al. | |
| 3,703,877 A | 11/1972 | Ueda | |
| 3,995,603 A | 12/1976 | Thien et al. | |
| 4,010,717 A | 3/1977 | Taplin | |
| 4,035,171 A | 7/1977 | Reed et al. | |
| 4,068,612 A | 1/1978 | Meiners | |
| 4,198,217 A | 4/1980 | Erdmannsdorfer | |
| 4,212,659 A | 7/1980 | Magrini | |
| 4,267,811 A | 5/1981 | Springer | |
| 4,285,632 A | 8/1981 | DeSalve | |
| 4,300,488 A | 11/1981 | Cser | |
| 4,319,657 A | 3/1982 | Nomura | |
| 4,321,896 A | 3/1982 | Kasting | |
| 4,326,374 A | 4/1982 | Streb | |
| 4,353,211 A | 10/1982 | Cser et al. | |
| 4,412,520 A | 11/1983 | Mitsuyasu et al. | |
| 4,422,295 A | 12/1983 | Minami et al. | |
| 4,459,808 A | 7/1984 | Rydquist et al. | |
| 4,475,617 A | 10/1984 | Minami et al. | |
| 4,496,019 A | 1/1985 | Tanaka | |
| 4,512,152 A | 4/1985 | Asaba | |
| 4,513,725 A | 4/1985 | Minami et al. | |
| RE31,877 E | 5/1985 | Nomura | |
| 4,519,373 A | 5/1985 | Hardy et al. | |
| 4,538,556 A | 9/1985 | Takeda | |
| 4,553,515 A | 11/1985 | King et al. | |
| 4,562,697 A * | 1/1986 | Lawson | 60/599 |
| 4,630,446 A | 12/1986 | Iwai et al. | |
| 4,633,826 A | 1/1987 | Tominaga et al. | |
| 4,662,323 A | 5/1987 | Moriya | |
| 4,674,457 A | 6/1987 | Berger et al. | |
| 4,677,826 A | 7/1987 | Iwai et al. | |
| 4,678,441 A | 7/1987 | Murase | |
| 4,709,682 A | 12/1987 | Kato | |
| 4,712,517 A | 12/1987 | Anno et al. | |
| 4,718,396 A | 1/1988 | Shimada et al. | |
| 4,723,526 A | 2/1988 | Horiuchi et al. | |
| 4,738,229 A | 4/1988 | Wada et al. | |
| 4,741,302 A | 5/1988 | Oda et al. | |
| 4,760,703 A | 8/1988 | Minami et al. | |
| 4,773,361 A | 9/1988 | Toki et al. | |
| 4,781,553 A | 11/1988 | Nomura et al. | |
| 4,796,574 A | 1/1989 | Fujii et al. | |
| 4,797,068 A | 1/1989 | Hayakawa et al. | |
| 4,827,722 A | 5/1989 | Torigai | |
| 4,848,170 A | 7/1989 | Inagaki et al. | |
| 4,887,692 A | 12/1989 | Outani et al. | |
| 4,896,734 A | 1/1990 | Horiuchi et al. | |
| 4,900,343 A | 2/1990 | Minami et al. | |
| 4,936,278 A | 6/1990 | Umeda | |
| 4,938,664 A | 7/1990 | Zinsmeyer | |
| 4,955,352 A | 9/1990 | Takeda | |
| 4,972,807 A | 11/1990 | Morishita | |
| 4,982,682 A | 1/1991 | Hattori | |
| 4,984,528 A | 1/1991 | Kobayashi | |
| 4,984,974 A | 1/1991 | Naya et al. | |
| 4,989,409 A | 2/1991 | Nakase et al. | |
| 4,991,532 A | 2/1991 | Locke | |
| 5,002,021 A | 3/1991 | Nakata et al. | |
| 5,009,204 A | 4/1991 | Ishii | |
| 5,014,816 A | 5/1991 | Dear et al. | |
| 5,031,591 A | 7/1991 | Shinoda et al. | |
| 5,060,622 A | 10/1991 | Suzuki | |
| 5,088,280 A | 2/1992 | Scott-Scott et al. | |
| 5,094,193 A | 3/1992 | Yoshikawa | |
| 5,095,859 A | 3/1992 | Iwata et al. | |
| 5,119,795 A | 6/1992 | Goto et al. | |
| 5,130,014 A | 7/1992 | Volz | |
| 5,133,307 A | 7/1992 | Kurihara | |
| 5,136,547 A | 8/1992 | Laukien | |
| 5,136,993 A | 8/1992 | Ampferer et al. | |
| 5,143,028 A | 9/1992 | Takahashi | |
| 5,158,427 A | 10/1992 | Shirai | |
| 5,159,903 A | 11/1992 | Takahashi | |
| 5,163,811 A | 11/1992 | Okada | |
| RE34,226 E | 4/1993 | Morishita | |
| 5,215,164 A | 6/1993 | Shibata | |
| 5,230,320 A | 7/1993 | Hitomi et al. | |
| 5,239,950 A | 8/1993 | Takahashi | |
| 5,243,945 A | 9/1993 | Katoh et al. | |
| 5,253,618 A | 10/1993 | Takahashi et al. | |
| 5,261,356 A | 11/1993 | Takahashi et al. | |
| 5,293,846 A | 3/1994 | Takahashi | |
| 5,299,423 A | 4/1994 | Shiozawa et al. | |
| 5,330,374 A | 7/1994 | Ishino | |
| 5,340,343 A | 8/1994 | Kawamukai et al. | |
| 5,340,344 A | 8/1994 | Mineo et al. | |
| 5,357,913 A | 10/1994 | Okumura et al. | |
| 5,365,908 A | 11/1994 | Takii et al. | |
| 5,377,629 A | 1/1995 | Brackett et al. | |
| 5,377,634 A | 1/1995 | Taue | |
| 5,389,022 A | 2/1995 | Kobayashi | |
| 5,390,621 A | 2/1995 | Hattori et al. | |
| RE34,922 E | 5/1995 | Hattori et al. | |
| 5,438,946 A | 8/1995 | Kobayashi | |
| 5,456,230 A | 10/1995 | VanRens et al. | |
| 5,476,402 A | 12/1995 | Nakai et al. | |
| 5,477,838 A | 12/1995 | Schlunke et al. | |
| 5,503,117 A | 4/1996 | Saito | |
| 5,513,606 A | 5/1996 | Shibata | |
| 5,529,027 A | 6/1996 | Okubo | |
| 5,537,968 A | 7/1996 | Takahashi | |
| 5,558,549 A | 9/1996 | Nakase et al. | |
| 5,584,733 A | 12/1996 | Kobayashi | |
| 5,586,922 A | 12/1996 | Kobayashi et al. | |
| 5,603,301 A | 2/1997 | Sakurai et al. | |
| 5,619,950 A | 4/1997 | Ikeda | |
| 5,632,239 A | 5/1997 | Patyi et al. | |
| 5,634,422 A | 6/1997 | Kobayashi et al. | |
| 5,636,586 A | 6/1997 | Suganuma | |
| 5,638,796 A | 6/1997 | Adams, III et al. | |
| 5,647,779 A | 7/1997 | Nanami | |
| 5,660,155 A | 8/1997 | Taue et al. | |
| 5,660,571 A | 8/1997 | Nakayasu et al. | |
| 5,664,515 A | 9/1997 | Hattori et al. | |
| 5,671,703 A | 9/1997 | Otome et al. | |
| 5,678,525 A | 10/1997 | Taue | |
| 5,682,870 A | 11/1997 | Motoyama | |
| 5,699,749 A | 12/1997 | Yamada et al. | |
| 5,709,185 A | 1/1998 | Aizawa et al. | |
| 5,709,186 A | 1/1998 | Taue | |
| 5,709,198 A | 1/1998 | Sagisaka et al. | |
| 5,743,206 A | 4/1998 | Hattori | |
| 5,746,270 A | 5/1998 | Schroeder et al. | |
| 5,755,194 A | 5/1998 | Moorman et al. | |
| 5,769,039 A | 6/1998 | Taue et al. | |
| 5,775,283 A | 7/1998 | Sawai et al. | |
| 5,778,833 A | 7/1998 | Kuranishi | |
| 5,778,838 A | 7/1998 | Taue | |
| 5,778,857 A | 7/1998 | Nakamura et al. | |
| 5,779,451 A | 7/1998 | Hatton | |
| 5,797,778 A | 8/1998 | Ito et al. | |
| 5,820,426 A | 10/1998 | Hale | |
| 5,827,096 A | 10/1998 | Mineo | |
| 5,829,402 A | 11/1998 | Takahashi et al. | |
| 5,830,021 A | 11/1998 | Takahashi et al. | |
| 5,839,930 A | 11/1998 | Nanami et al. | |
| 5,845,618 A | 12/1998 | Taue et al. | |
| 5,846,102 A | 12/1998 | Nitta et al. | |
| 5,855,193 A | 1/1999 | Takahashi | |
| 5,871,340 A | 2/1999 | Hatton | |
| 5,871,380 A * | 2/1999 | Claussen | 440/75 |
| 5,899,778 A | 5/1999 | Hiraoka et al. | |

| | | | | | |
|---|---|---|---|---|---|
| 5,902,161 A | 5/1999 | Nakase | 2005/0172919 A1 | 8/2005 | Ozaki et al. |
| 5,906,083 A | 5/1999 | Olsen et al. | 2005/0204730 A1 | 9/2005 | Tsukahara et al. |
| 5,908,337 A | 6/1999 | Mashiko | 2005/0247498 A1 | 11/2005 | Pichler et al. |
| 5,911,211 A | 6/1999 | Uchida | 2006/0243259 A1 | 11/2006 | Takahashi |
| 5,928,044 A | 7/1999 | Mineo | | | |
| 5,934,070 A | 8/1999 | Lagelstorfer | FOREIGN PATENT DOCUMENTS | | |
| 5,937,818 A | 8/1999 | Kawai et al. | EP | 0 500 139 B1 | 8/1992 |
| 5,937,825 A | 8/1999 | Motose | FR | 1263608 | 5/1996 |
| 5,941,223 A | 8/1999 | Kato | GB | 1389973 A | 4/1975 |
| 5,951,343 A | 9/1999 | Nanami et al. | JP | 57-062929 | 4/1982 |
| 5,957,072 A | 9/1999 | Hattori | JP | 57-062930 | 4/1982 |
| 5,957,112 A | 9/1999 | Takahashi et al. | JP | 57-073817 | 5/1982 |
| 5,960,770 A | 10/1999 | Taue et al. | JP | 57-073818 | 5/1982 |
| 5,983,878 A | 11/1999 | Nonaka et al. | JP | 57-073820 | 5/1982 |
| 6,006,540 A | 12/1999 | Coletti | JP | 57-083632 | 5/1982 |
| 6,009,705 A | 1/2000 | Arnott et al. | JP | 57-093627 | 6/1982 |
| 6,015,320 A | 1/2000 | Nanami | JP | 57-105537 | 7/1982 |
| 6,015,321 A | 1/2000 | Ozawa et al. | JP | 57-113922 | 7/1982 |
| 6,016,782 A | 1/2000 | Henmi | JP | 57-113944 | 7/1982 |
| 6,022,252 A | 2/2000 | Ozawa | JP | 57-151019 | 9/1982 |
| 6,026,775 A | 2/2000 | Yamane | JP | 57-171027 | 10/1982 |
| 6,029,638 A | 2/2000 | Funai et al. | JP | 57-181931 | 11/1982 |
| 6,041,758 A | 3/2000 | Ishii | JP | 57-183512 | 11/1982 |
| 6,055,959 A | 5/2000 | Taue | JP | 57-191421 | 11/1982 |
| 6,079,378 A | 6/2000 | Taue et al. | JP | 57-203822 | 12/1982 |
| 6,085,702 A | 7/2000 | Ito | JP | 58-044221 | 3/1983 |
| 6,099,371 A | 8/2000 | Nozawa et al. | JP | 58-053655 | 3/1983 |
| 6,142,842 A | 11/2000 | Watanabe et al. | JP | 58-057023 | 4/1983 |
| 6,149,477 A | 11/2000 | Toyama | JP | 58-082038 | 5/1983 |
| 6,171,380 B1 | 1/2001 | Wood et al. | JP | 58-128925 | 8/1983 |
| 6,205,987 B1 | 3/2001 | Shigedomi et al. | JP | 58-170628 | 10/1983 |
| 6,213,062 B1 | 4/2001 | Kawase | JP | 58-185927 | 10/1983 |
| 6,263,851 B1 | 7/2001 | Henmi | JP | 58-185929 | 10/1983 |
| 6,269,797 B1 | 8/2001 | Uchida | JP | 58-185930 | 10/1983 |
| 6,279,372 B1 | 8/2001 | Zhang | JP | 58-185931 | 10/1983 |
| 6,286,492 B1 | 9/2001 | Kanno | JP | 58-185932 | 10/1983 |
| 6,302,752 B1 | 10/2001 | Ito et al. | JP | 58-192924 | 11/1983 |
| 6,312,299 B1 | 11/2001 | Henmi | JP | 58-194695 | 11/1983 |
| 6,318,085 B1 | 11/2001 | Torno et al. | JP | 59-018228 | 1/1984 |
| 6,390,869 B2 | 5/2002 | Korenjak et al. | JP | 59-053229 | 3/1984 |
| 6,394,060 B2 | 5/2002 | Nagai et al. | JP | 59-176419 | 10/1984 |
| 6,394,777 B2 | 5/2002 | Haavik | JP | 59-201932 | 11/1984 |
| 6,415,759 B2 | 7/2002 | Ohrnberger et al. | JP | 59-220492 | 12/1984 |
| 6,447,351 B1 | 9/2002 | Nanami | JP | 60-119328 | 6/1985 |
| 6,453,890 B1 | 9/2002 | Kageyama et al. | JP | 60-150445 | 8/1985 |
| 6,497,596 B1 | 12/2002 | Nanami | JP | 60-240522 | 11/1985 |
| 6,516,789 B1 | 2/2003 | Jones | JP | 60-240523 | 11/1985 |
| 6,517,397 B1 | 2/2003 | Gohara et al. | JP | 60-240524 | 11/1985 |
| 6,544,086 B2 | 4/2003 | Tscherne et al. | JP | 60-240525 | 11/1985 |
| 6,568,376 B2 | 5/2003 | Sonnleitner et al. | JP | 61-126324 | 6/1986 |
| 6,578,508 B2 | 6/2003 | Hattori et al. | JP | 61-126325 | 6/1986 |
| 6,591,819 B2 | 7/2003 | Tscherne et al. | JP | 61-215123 | 9/1986 |
| 6,601,528 B2 | 8/2003 | Bilek et al. | JP | 61-237824 | 10/1986 |
| 6,623,321 B2 | 9/2003 | Ishino | JP | 62-060926 | 3/1987 |
| 6,626,140 B2 | 9/2003 | Aichinger et al. | JP | 62258130 | 11/1987 |
| 6,637,406 B2 | 10/2003 | Yamada et al. | JP | 01-119421 | 5/1989 |
| 6,640,754 B1 | 11/2003 | Iida | JP | 01-182560 | 7/1989 |
| 6,644,942 B2 | 11/2003 | Rival et al. | JP | 01-211615 | 8/1989 |
| 6,651,633 B1 | 11/2003 | Jones | JP | 01-229786 | 9/1989 |
| 6,663,366 B2 | 12/2003 | Okada et al. | JP | 01-232112 | 9/1989 |
| 6,672,918 B2 | 1/2004 | Mashiko et al. | JP | 01-232113 | 9/1989 |
| 6,746,288 B2 | 6/2004 | Gokan | JP | 01-232115 | 9/1989 |
| 6,769,942 B2 | 8/2004 | Bourret et al. | JP | 01-232116 | 9/1989 |
| 6,793,546 B2 | 9/2004 | Matsuda | JP | 01-232118 | 9/1989 |
| 6,796,126 B2 | 9/2004 | Hasegawa et al. | JP | 01-301917 | 12/1989 |
| 6,810,855 B2 | 11/2004 | Hasegawa et al. | JP | 01-301918 | 12/1989 |
| 6,896,566 B2 | 5/2005 | Takahashi et al. | JP | 01-301919 | 12/1989 |
| 6,973,985 B2 | 12/2005 | Yatagai et al. | JP | 01-313624 | 12/1989 |
| 7,007,682 B2 | 3/2006 | Takahashi et al. | JP | 02-006289 | 1/1990 |
| 7,101,238 B2 | 9/2006 | Aichinger et al. | JP | 02-016327 | 1/1990 |
| 2001/0044352 A1 | 11/2001 | Korenjak et al. | JP | 02-024282 | 1/1990 |
| 2002/0025742 A1 | 2/2002 | Berthiaume et al. | JP | 02-024283 | 1/1990 |
| 2003/0015126 A1 | 1/2003 | Gokan | | | |

| | | |
|---|---|---|
| JP | 02-024284 | 1/1990 |
| JP | 02-070920 | 3/1990 |
| JP | 02-119636 | 5/1990 |
| JP | 02-175491 | 7/1990 |
| JP | 02-188624 | 7/1990 |
| JP | 02-201026 | 8/1990 |
| JP | 02-294520 | 12/1990 |
| JP | 03-021584 | 1/1991 |
| JP | 03-023317 | 1/1991 |
| JP | 03-047425 | 2/1991 |
| JP | 03-168352 | 7/1991 |
| JP | 03-179152 | 8/1991 |
| JP | 03-182626 | 8/1991 |
| JP | 03-182635 | 8/1991 |
| JP | 03-260368 | 11/1991 |
| JP | 03-281939 | 12/1991 |
| JP | 04-081325 | 3/1992 |
| JP | 04-203317 | 7/1992 |
| JP | 07-311626 | 11/1992 |
| JP | 05-141260 | 6/1993 |
| JP | 05-141262 | 6/1993 |
| JP | 05-332188 | 12/1993 |
| JP | 06-093869 | 4/1994 |
| JP | 06-212986 | 8/1994 |
| JP | 07-091264 | 4/1995 |
| JP | 07-145730 | 6/1995 |
| JP | 07-151006 | 6/1995 |
| JP | 07-317545 | 12/1995 |
| JP | 07-317555 | 12/1995 |
| JP | 07-317556 | 12/1995 |
| JP | 07-317557 | 12/1995 |
| JP | 08-028280 | 1/1996 |
| JP | 08-028285 | 1/1996 |
| JP | 08-104286 | 4/1996 |
| JP | 08-104295 | 4/1996 |
| JP | 08-114122 | 5/1996 |
| JP | 08-114123 | 5/1996 |
| JP | 08-114124 | 5/1996 |
| JP | 08-114125 | 5/1996 |
| JP | 08-151926 | 6/1996 |
| JP | 08-151965 | 6/1996 |
| JP | 08-296449 | 12/1996 |
| JP | 08-319840 | 12/1996 |
| JP | 08-319901 | 12/1996 |
| JP | 09-184426 | 7/1997 |
| JP | 09-287465 | 11/1997 |
| JP | 09-287467 | 11/1997 |
| JP | 09-287470 | 11/1997 |
| JP | 09-287471 | 11/1997 |
| JP | 09-287472 | 11/1997 |
| JP | 09-287475 | 11/1997 |
| JP | 09-287486 | 11/1997 |
| JP | 10-008973 | 1/1998 |
| JP | 10-008974 | 1/1998 |
| JP | 10-089079 | 4/1998 |
| JP | 10-131818 | 5/1998 |
| JP | 10-299525 | 11/1998 |
| JP | 2000-038968 | 2/2000 |
| JP | 3060489 | 4/2000 |
| JP | 2001-082160 | 3/2001 |
| JP | 2001-098960 | 4/2001 |
| JP | 2001-233276 | 8/2001 |
| JP | 2001-233277 | 8/2001 |
| JP | 2001-263076 | 9/2001 |
| JP | 2001-280144 | 10/2001 |
| JP | 2001-323819 | 11/2001 |
| JP | 2003-027952 | 1/2003 |
| JP | 2003-049654 | 2/2003 |
| JP | 2003-074445 | 3/2003 |
| JP | 2006-083713 | 3/2006 |

OTHER PUBLICATIONS

Co-pending U.S. Appl. No. 11/154,490, filed Jun. 16, 2005. Now published as US-2005-0279335. Title Water Jet Propulsion Boat. Inventor: Ozawa. Our Ref. FS.20215US0A.

Co-pending U.S. Appl. No. 11/186,477, filed Jul. 21, 2005. Now published as US-2006-0016437. Title: Intake System for Supercharged Engine. Inventor: Ozawa. Our Ref. FS.20216US0A.

Co-pending U.S. Appl. No. 11/153,940, filed Jun. 16, 2005. Now published as US-2005-0279092. Title: Water Jet Propulsion Boat. Inventor: Ozawa. Our Ref. FS.20217US0A.

Co-pending U.S. Appl. No. 11/224,829, filed Sep. 12, 2005. Now published as US-2006-0054146. Title: Supercharger Lubication Structure. Inventor: Ozawa. Our Ref. FS.20234US0A.

Co-pending U.S. Appl. No. 11/226,497, filed Sep. 14, 2005. Now published as US-2006-0030170. Title: Supercharger Lubication Structure. Inventor Ozawa. Our Ref. FS.20235US0A.

Co-pending U.S. Appl. No. 11/527,189, filed Sep. 26, 2006. Now published as US-2007-0079796. Title: Installation Structure for Compressor. Inventor: Mineo. Our Ref. FS.20332US0A.

* cited by examiner

SMALL PLANING BOAT

PRIORITY INFORMATION

The present application is based on and claims priority under 35 U.S.C. § 119(a-d) to Japanese Patent Application No. 2005-247767, filed on Aug. 29, 2005, the entire contents of which is expressly incorporated by reference herein.

BACKGROUND OF THE INVENTIONS

1. Field of the Inventions

The present inventions relate to a small planing boat with an intercooler for cooling air used by the engine for combustion.

2. Description of the Related Art

Small planing boats, including those commonly referred to as "personal watercraft", generate propulsion forces by drawing in water from a water inlet on the bottom of their hull and discharge it rearwardly with a jet pump. Recently, personal watercraft with turbo chargers and super chargers have become commercially available. In certain of these watercraft, both a compressor, such as a turbo or a supercharger are used to compress air to be supplied to the engine, which raises the temperature. Additionally, Certain of these watercraft include an intercooler to cool the compressed air, and thereby increase the density of the compressed air, thereby improving the engine output and in particular acceleration properties. For example, U.S. Pat. No. 6,746,288 discloses such a watercraft.

In this type of small planing boat, the engine can be disposed with its crankshaft extending in the longitudinal direction of the body and a compressor (in this case a turbocharger) can be disposed toward the rear of the engine. An intake manifold can be disposed at an upper part of the side of the engine and an intercooler can be disposed, extending longitudinally, at the side of the engine below the intake manifold. The compressor and the upper rearward portion of the intercooler are connected by a pipe and the upper forward portion of the intercooler and the intake manifold are connected by a tube.

Inside the intercooler is a cooling unit. On both longitudinal ends of the cooling unit are connected cooling hoses protruding from approximately the middle of the intercooler between its longitudinal ends. Cooling water enters the cooling unit from the center of the intercooler at the forward end and exits from the center of the intercooler at the rear end after cooling air in the intercooler by heat exchange while passing through the cooling unit. Therefore, air compressed by the compressor is cooled by the intercooler and the cooled, compressed air is supplied to cylinders of the engine through the intake manifold.

SUMMARY OF THE INVENTIONS

An aspect of at least one of the embodiments disclosed herein includes the realization that further reductions in the progress of corrosion can be achieved by changing the configuration of the cooling jacket of certain intercoolers, such at the intercooler disclosed in the above-described U.S. Pat. No. 6,746,288. For example, in many water vehicles, outboard motors, and the like, water from which the device is operated is drawn in and is used as cooling water for cooling an engine and an intercooler or the like. However, this can causes corrosion if the water, particularly if it is salt water, remains inside the engine and intercooler or the like after the engine stops.

In the design disclosed in U.S. Pat. No. 6,746,288, the intercooler extends longitudinally along a side of the engine, with cooling hoses connected to both ends thereof in the longitudinal direction. However, a problem is raised by this design in that time is required before the cooling water in the intercooler has drained out after the engine stops, or in some cases, cooling water remaining in the intercooler may cause corrosion. In addition, small planing boats, including personal watercraft, can move up and down during running. Therefore, with the intercooler arranged so that it extends longitudinally as in the design disclosed in U.S. Pat. No. 6,746,288, the influence on the intercooler due to the up and down movement is larger, which might cause damage.

Thus, in accordance with an embodiment, a small planing boat can comprise a hull, an engine supported by the hull and connected to an intake passage configured to introduce air into the engine. An exhaust passage can be configured to guide exhaust gas away from the engine. A crankshaft can be disposed so as to extend generally in a longitudinal direction of the hull. An intercooler can be configured to cool air to be supplied to the engine with cooling water and can include an upper end, a lower end, an internal air passage, a cooling water passage configured to guide cooling water into thermal communication with the air passage, at least one cooling water inlet, and at least one cooling water outlet. Either the at least one cooling water inlet is disposed at the upper end and the cooling water outlet is disposed at the lower end or the cooling water inlet is disposed at the lower end and the cooling water outlet is disposed at the upper end.

In accordance with another embodiment, a small planing boat can comprise a hull, an engine supported by the hull, and an intercooler having a cooling water passage configured to cool air to be supplied to the engine for combustion therein with cooling water. The intercooler can include first and second cooling water ports, the first port being disposed in the vicinity of a bottom of the cooling water passage.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following figures.

DETAILED DESCRIPTION OF THE PREFERRED EMBODIMENT

Figure 1:
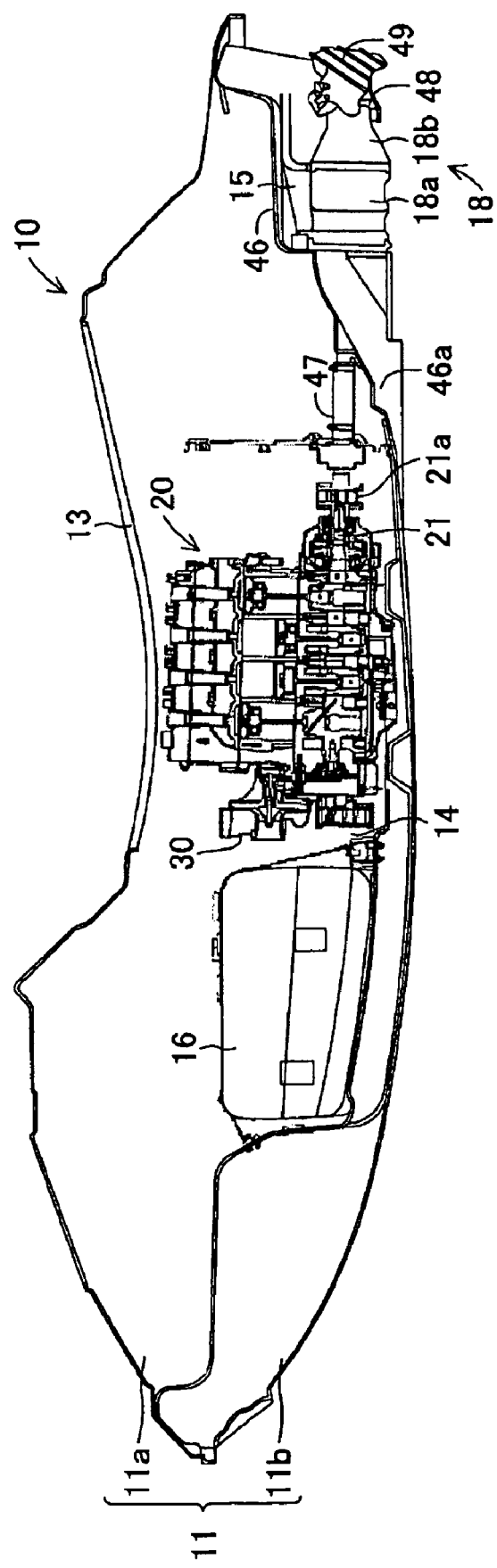
FIG. 1 is a partial sectional and cut-away view of a watercraft constructed in accordance with an embodiment, showing an interior of the watercraft as well as some internal components of an engine inside the watercraft.
Figure 2:
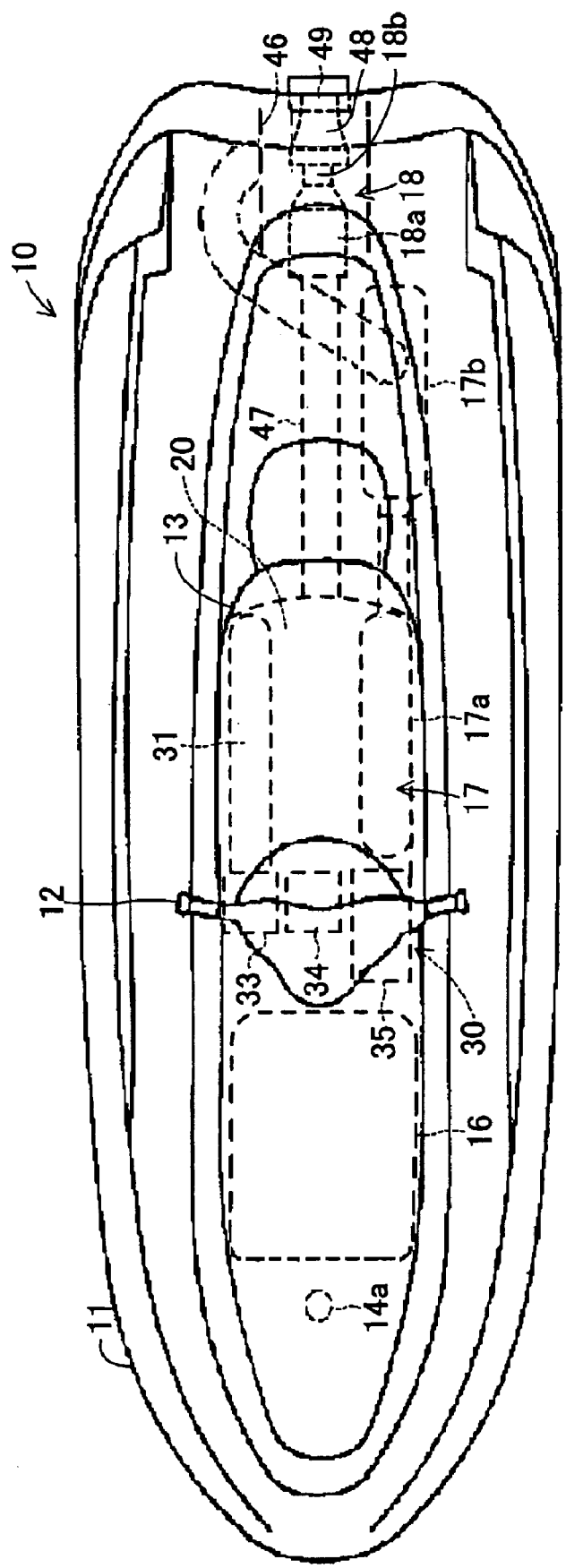
FIG. 2 is a top plan view of the small planing boat shown in FIG. 1, with some internal components shown in phantom line.

FIG. 1 and FIG. 2 show a watercraft 10 having a cooling system according to an embodiment. The cooling system is disclosed in the context of a personal watercraft because it has particular utility in this context. However, the cooling system can be used in other contexts, such as, for example, but without limitation, outboard motors, inboard/outboard motors, and for engines of other vehicles including land vehicles.

The watercraft 10 can have a body 11. The body can include a deck 11a and a hull 11b assembled together. Steering handlebars 12 can be provided at the upper part of the body 11 in a region a little more forward than the middle thereof and a seat 13 at the upper part of the body 11 centrally thereof. The handlebars 12 and the seat 13 can be considered as defining an operator's area of the watercraft 10.

The interior of the body 11 can include an engine room 14 formed to extend from the front of the body 11 to the middle, and a pump room 15 formed at the rear of the body 11. In the engine room 14 are disposed a fuel tank 16, an engine 20, an intake system 30, an exhaust system 17 and the like, and in the pump room 15 a propulsion unit 18 made up of a jet pump 18a and the like. The interior of the body 11 can include one or a plurality of bulkheads dividing this space into a plurality of substantially separate compartments. However, other configurations can also be used.

In the forward and rearward areas of the engine room 14, air ducts 14a can be provided (the air duct on the rearward side is not shown) for introducing and/or circulating outside air into or through the engine room 14. The air duct 14a can extend generally vertically from the top of the body 11 toward the bottom of the engine room 14. The air duct 14a can be arranged such that it draws outside air from the upper end through a water-proof structure (not shown) provided on the deck 11a and then guides it into the engine room 14 from the lower end of the air duct 14a.

A fuel tank 16 for holding fuel can be disposed on the forward side of the engine room 14. The engine 20 can be disposed in the engine room 14 at the bottom center of the body 11. However, other configurations can also be used.

The engine 20 can be a water-cooled, four-stroke, in-line, four-cylinder engine. However, other types of engines can be used which operate on other types of combustion principles (e.g., diesel, rotary, two-stroke), have other cylinder configurations (V-type, W-type, horizontally opposed, etc.), and have other numbers of cylinders.

Figure 3:
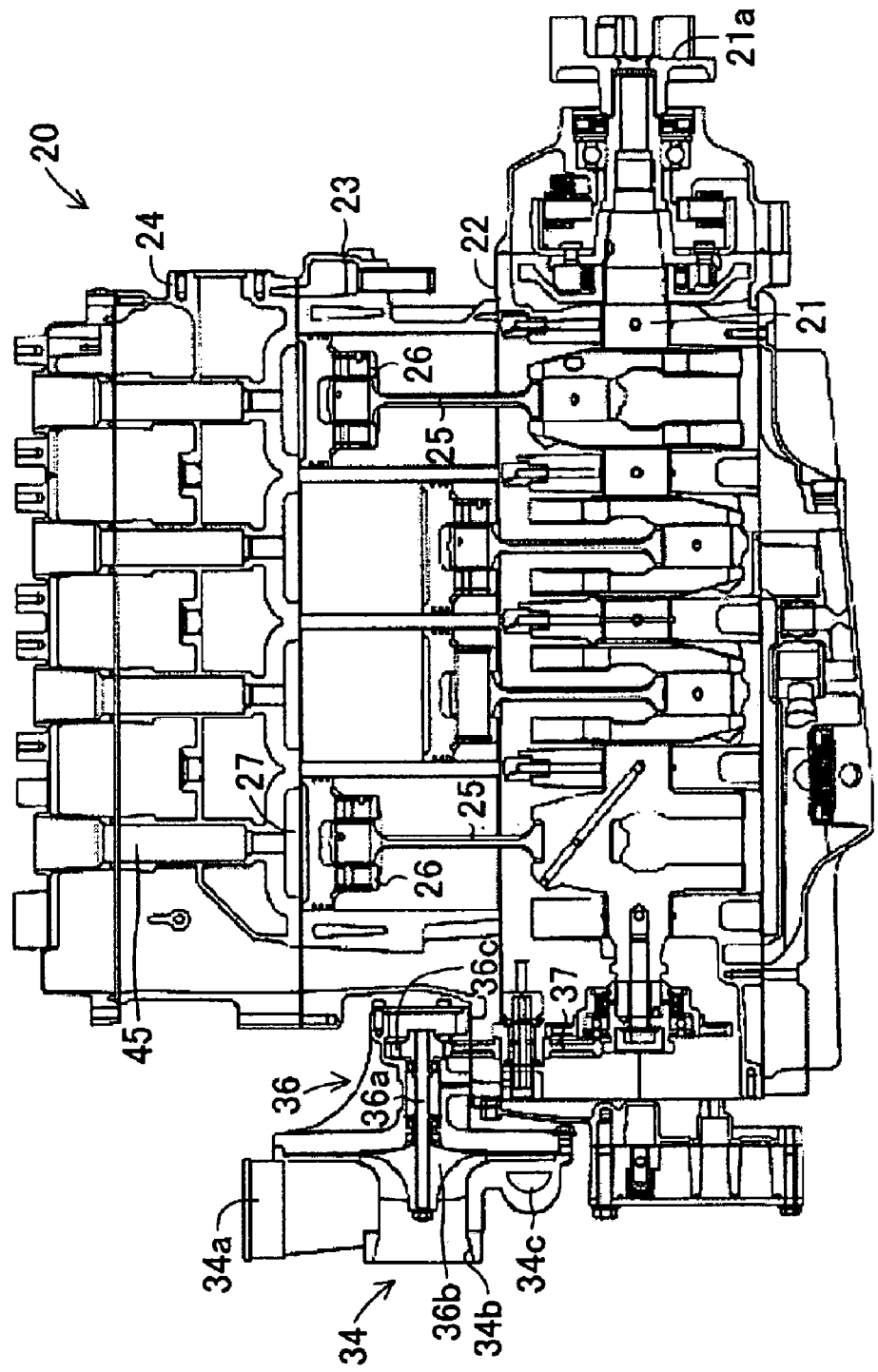
FIG. 3 is a port side sectional view of the engine.

As shown in FIG. 3, an external portion of the engine 20 can include a cylinder body 23 and a cylinder head 24 being assembled successively onto a crankcase 22 which can house a crankshaft 21. The cylinder body 23 and the cylinder head 24 can define a cylinder. The engine 20 can be arranged such that a center axis of the cylinder extends approximately vertically such that it crosses at right angles the crankshaft 21 extending approximately horizontally.

Inside the cylinder body 23 and the cylinder head 24 are housed pistons 26 connected to the crankshaft 21 through connecting rods 25 for up and down movement. The up and down motion of the pistons 26 can be transmitted to the crankshaft 21 to produce the rotational motion of the crankshaft 21. Cylinders 27 formed in the cylinder head 24 are each provided with intake and exhaust valves (not shown).

Intake ports can be communication with the intake valves in each cylinder 27. These intake ports can be connected to an intake system 30 which can include intake manifold pipes 31a and the like such as those shown in FIG. 4.

Exhaust ports can be communication with the exhaust valves and can also be connected to an exhaust system 17. The exhaust system 17 can include exhaust manifold pipes (not shown) or the like.

The intake valve can be controlled so as to open at the time of air-intake (i.e., when the associated piston 26 moves downwardly in the associated cylinder) to allow a mixture of air supplied from the intake system 30 and fuel supplied from a fuel supply system (not shown) to flow into the cylinder head 24. Additionally, the intake valve can be closed at the during the exhaust stroke. The exhaust valves can be opened during an exhaust stroke (i.e., when the piston moves upwardly in the cylinder) to allow combustion gas to be discharged from the cylinder head 24. Additionally, the exhaust valves can be closed during the intake stroke.

Figure 4:
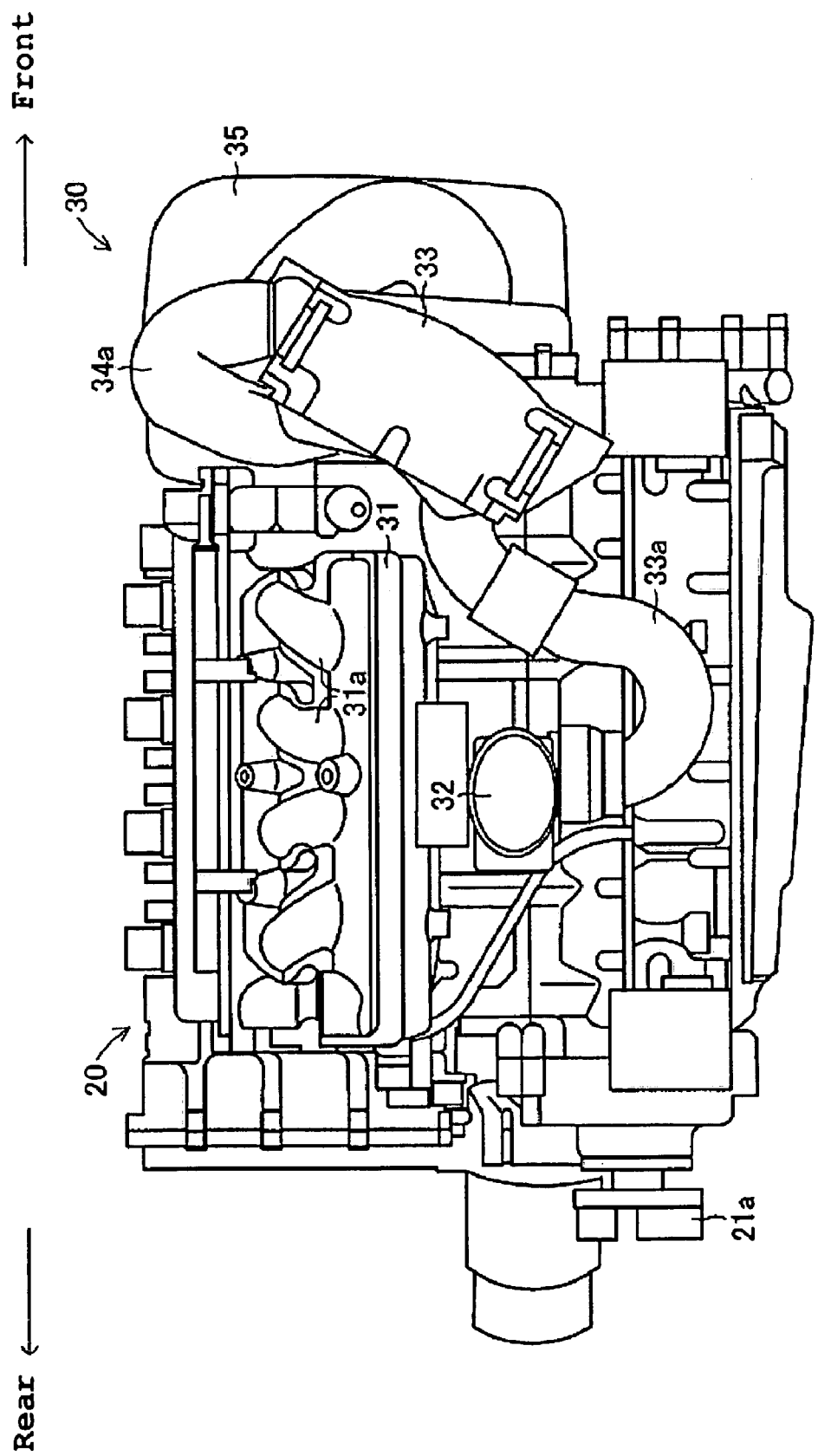
FIG. 4 is a starboard side elevational view of the engine and an intercooler connected to the engine.
Figure 5:
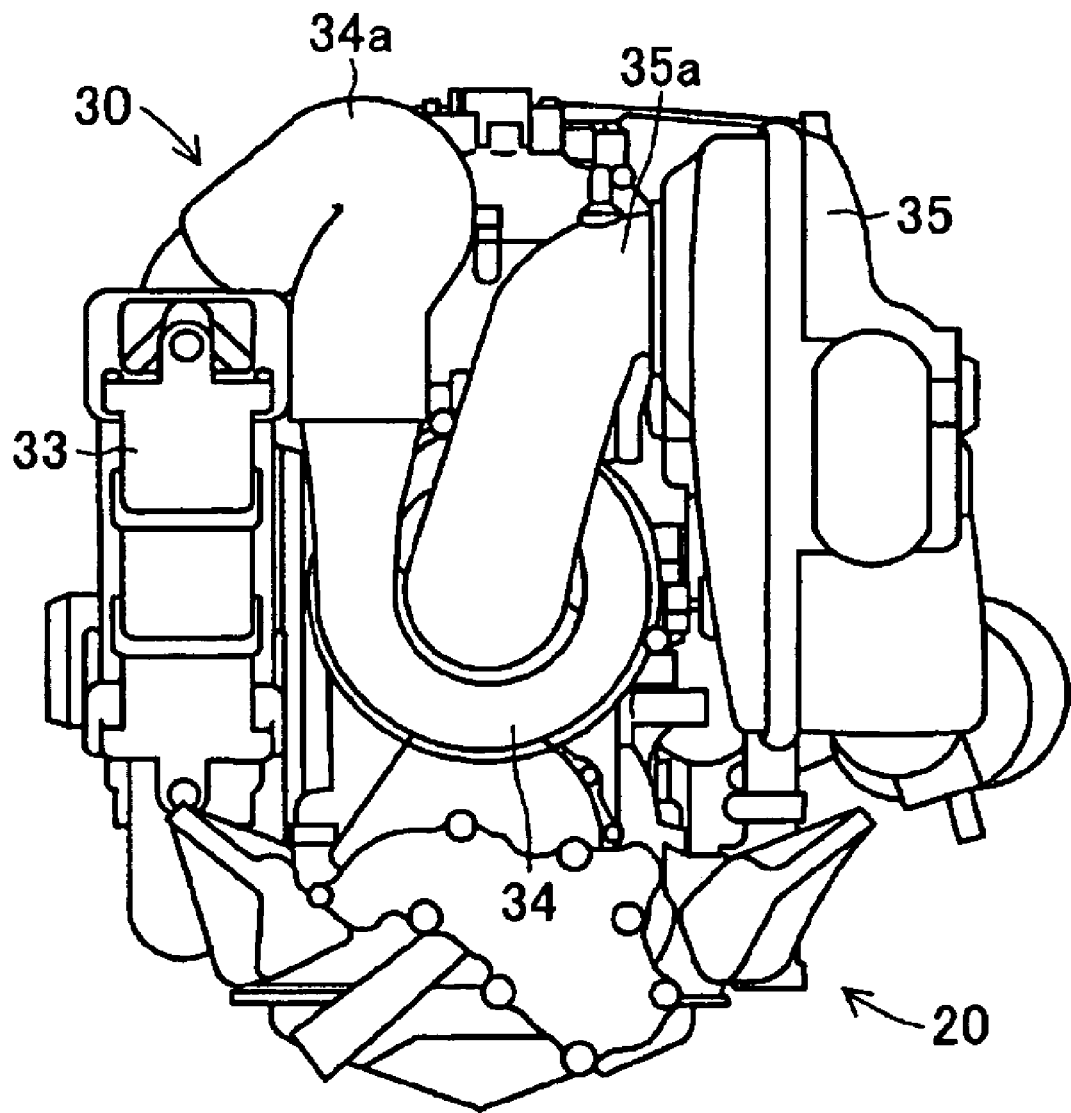
FIG. 5 is a front elevational view of the intercooler and a supercharger connected to the engine.

The intake system 30 can include, as shown in FIG. 4 and FIG. 5, intake manifold pipes 31a connected to the intake ports of the cylinders 27, an intake manifold 31 connected to the upstream ends (lower ends) of the intake manifold pipes 31a, a throttle body 32 connected to the upstream end of the intake manifold 31, an intercooler 33 connected to the throttle body 32 through an air duct 33a, a supercharger 34 connected to the intercooler 33 through an air passage 34a made from a tube and an intake box 35 connected to the supercharger 34 through an air passage 35a made from a tube. However, other configurations can also be used. The intake manifold pipes 31a, intake manifold 31 and air duct 33a can be considered as forming an intake passage. However, other configurations can also be used. FIG. 1 and FIG. 3 are sectional views, and therefore the intake box 35 and air passages 34a, 35a are omitted.

With reference to FIG. 2, the intake box 35 can be disposed on a port side portion near the engine 20, and in some embodiments, between the engine 20 and the fuel tank 16. The intake box 35 can be provided with an air filter (not shown) inside. As such, air that had entered the engine room 14 through the air duct 14a, can then be drawn through the filter, thereby removing foreign materials. After being filtered, the air can then be drawn into the supercharger 34 through the air passage 35a. n However, other configurations can also be used.

The supercharger 34 can be disposed at the forward end of the engine 20, approximately centrally. The supercharger 34 can be provided with an intake port 34b (FIG. 3) which can be connected to the air passage 35a (FIG. 5). As such, air from the intake box 35 can be guided into the port 34a.

The supercharger 34 can also include a discharge port 34c which can be connected to the air passage 34a and through which air from the discharge port 34c can be guided to the intercooler 33. The discharge port 34c, in some embodiments, can extend upwardly and can be connected at the upper end to the air passage 34a.

The supercharger 34 can include a rotary section 36 provided with a rotational shaft 36a and a vane 36b connected to the forward end of the rotational shaft 36a for rotation with the rotational shaft 36a. The rotary section 36 can be mounted, with the vane 36b facing toward the intake port 34b.

To the rear end of the rotational shaft 36a can be mounted a gear 36c. To the forward end of the crankshaft 21 can be mounted a flywheel 37 meshed with the gear 36c for transmitting the rotational force of the crankshaft 21 to the rotary section 36. Therefore, when the crankshaft 21 is rotated by the operation of the engine 20, the rotational force can be transmitted to the rotary section 36 through the flywheel 37 and gear 36c to rotate the vane 36b. As a result of the rotation of the vane 36b, air to be sent from the air passage 35a to the intake port 34b can be compressed and can be discharged from the discharge port 34c to the air passage 34a. The air raises its temperature during compression by the supercharger 34 and lowers its density accordingly. However, a turbo charger can also be used.

The intercooler 33 can be disposed beside the supercharger 34 at the forward end of the engine 20 and on the starboard side of the body 11. In this arrangement, compressed air sent from the supercharger 34 through the air passage 34a is cooled as it passes through the intercooler 33.

Figure 6:
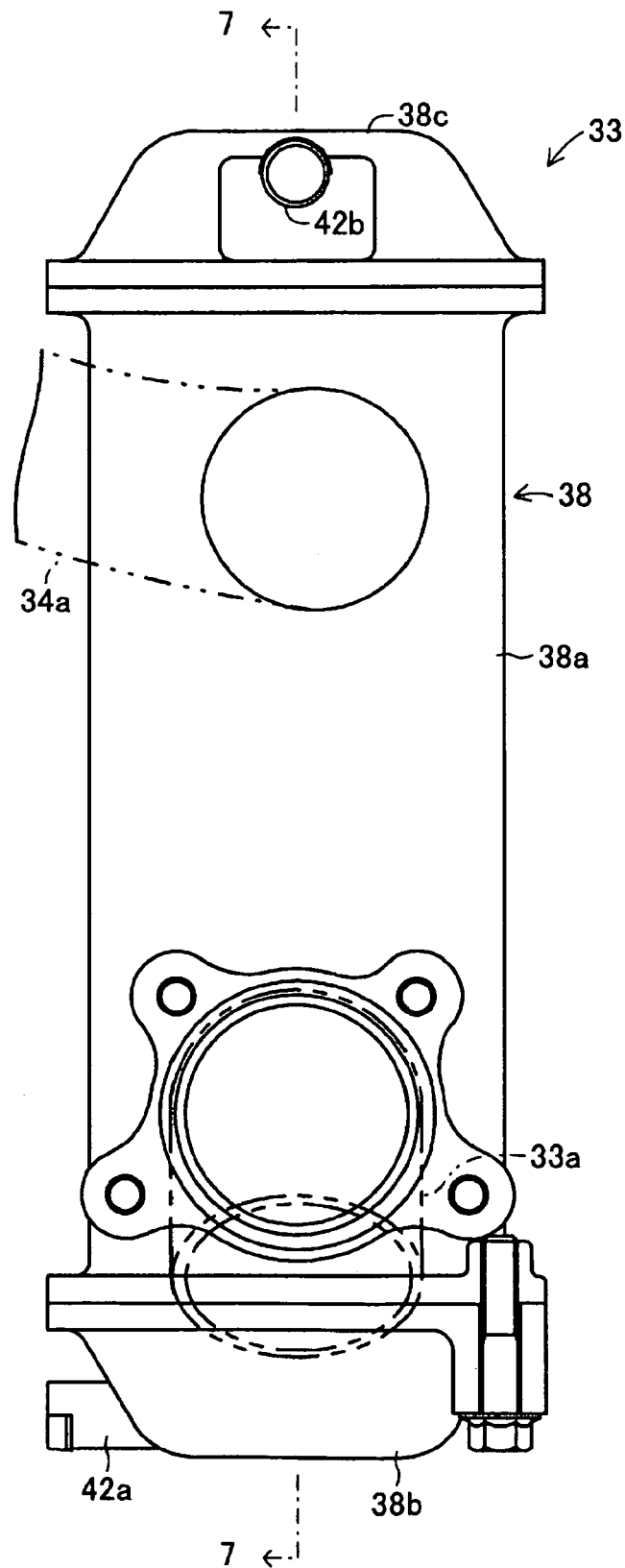
FIG. 6 is an elevational view of the intercooler.
Figure 8:
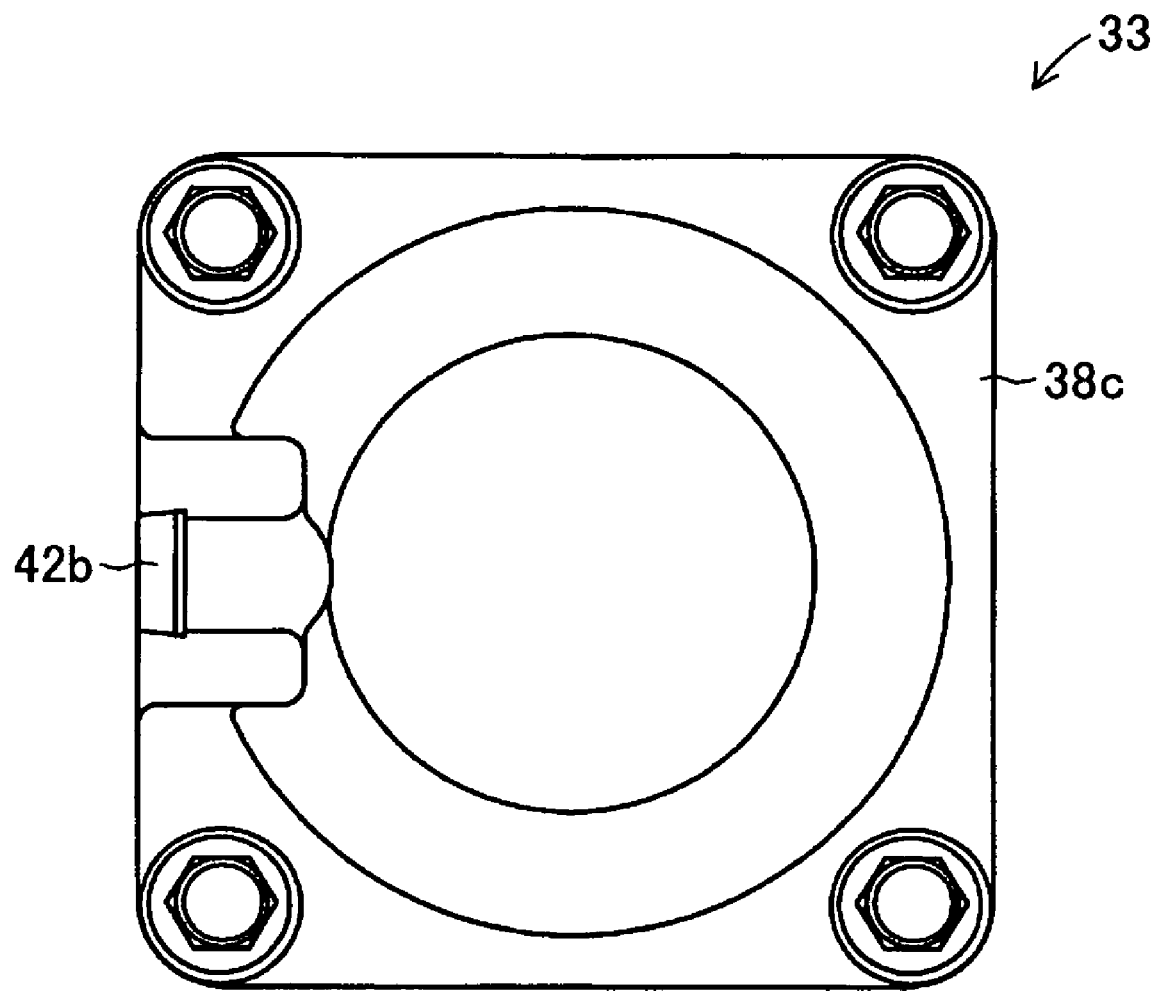
FIG. 8 is a top plan view of the intercooler.

With reference to FIG. 6 and FIG. 8, the intercooler 33 can be formed in the shape of a vertically elongated rectangular box. The intercooler 33 can also be inclined with the top side positioned more forward than the bottom side.

Figure 7:
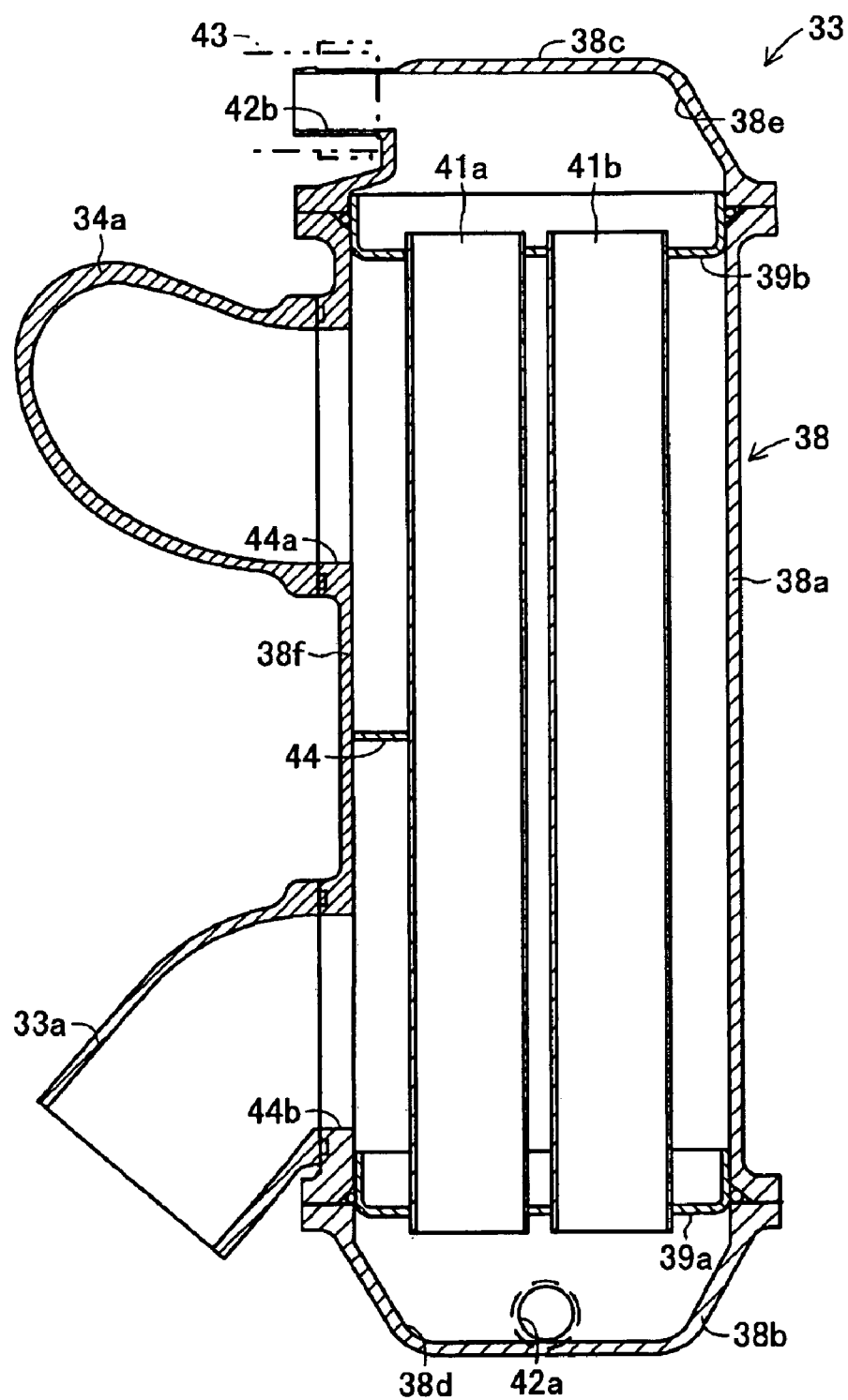
FIG. 7 is a sectional view of the intercooler taken along the line 7-7 of FIG. 6.

With additional reference to FIG. 7, the external portion of the intercooler 33 can be include a case 38 which can have a case body 38a in a rectangular cylindrical shape, and lid members 38b, 38c for closing the top and bottom of the case body 38a, respectively. In the inner bottom side and the inner top side of the case 38 can be provided partition walls 39a, 39b. The partition walls 39a, 39b can extend perpendicularly to the axial direction of the case 38, respectively, and at the lower end and the upper end can be formed a lower chamber 38d and an upper chamber 38e, respectively. However, other configurations can also be used.

With continued reference to FIG. 7, tube-like passages 41a, 41b penetrate at their ends the opposed portions of each of the partition walls 39a, 39b for communication between the lower chamber 38d and the upper chamber 38e. At the lower end of the case 38 can be formed a cooling water inlet 42a and at the upper end thereof a cooling water outlet 42b.

The cooling water inlet 42a can be connected to a cooling water feed pipe (not shown) through which outside water can be taken in as cooling water. For example, a cooling water supply passage (not shown) can be connected to a portion of the jet pump 18a, or another water pump. In some embodiments, the cooling water supply passage can extend from a high pressure portion of the jet pump 18a to the inlet 42a. Thus, during operation of the jet pump 18a or any other pump, higher pressure water is directed into the intercooler 33 through the inlet 42a. The cooling water outlet 42b, on the other hand, can be connected to a cooling water discharge pipe 43. Thus, during operation, cooling water, after having cooled the interior of the intercooler 33, can be discharged to the outside of the watercraft 10.

Therefore, cooling water taken in from the cooling water feed pipe enters the lower chamber 38d from the cooling water inlet 42a, passing through the passages 41a, 41b and upper chamber 38e and can be discharged from the cooling water outlet 42b through the cooling water discharge pipe 43. The cooling water inlet 42a, lower chamber 38d, passages 41a, 41 b, upper chamber 38e and cooling water outlet 42b can be considered as forming a cooling water passage. However, other configurations can also be used.

Between the approximately central portion of a rear surface 38f of the case 38 in the vertical direction and a portion of the passage 41a opposite to the central portion can be formed a partition wall 44, and the upper part and the lower part of the case 38 in the inner rearward side can be isolated.

In the rear surface 38f of the case 38 at the upper part can be formed an air inlet 44a and at the lower part an air outlet 44b. To the air inlet 44a can be connected the air passage 34a extending from the supercharger 34, and to the air outlet 44b the air duct 33a extending toward the throttle body 32. Therefore, compressed air sent from the supercharger 34 enters the inner top side of the case 38 from the air passage 34a through the air inlet 44a, proceeds to the inner forward side of the case 38 and thereafter moves downwardly.

The compressed air can be sent to the air duct 33a from the inner bottom side portion of the case 38 through the air outlet 44b. Meanwhile, the air can be cooled by cooling water flowing upwardly through the cooling water passage from below. After cooling, the cooled, compressed air can be sent to the throttle body 32 through the air duct 33a. The air inlet 44a, inner top side portion, inner forward side portion, inner bottom side portion of the case 38 and air outlet 44b can be considered as forming an air passage. However other configurations can also be used.

The throttle body 32 can be provided with a horizontal rotational shaft and a disk-like throttle valve (not shown) mounted on the horizontal rotational shaft and rotatable therewith. With rotation of the horizontal rotational shaft, the throttle valve opens and closes the air passage in the throttle body 32 so that the flow rate of air supplied to each cylinder 27 can be adjusted. This adjustment of the airflow rate can be performed by controlling a throttle controller (not shown) provided on a grip of the steering handlebars 12.

The intake manifold 31 can be formed by a tube-like body, connected to the upper end of the throttle body 32, and disposed along the starboard side surface of the engine 20 at its upper part. The foregoing four intake manifold pipes 31a extend from the top of the intake manifold 31 at fixed intervals in the longitudinal direction, each extending obliquely upwardly from the upstream end (lower end) connected to the intake manifold 31 and being connected at its leading end to the intake port of the cylinder 27. The intake manifold 31 prevent intake pulsation of compressed air sent from the intercooler 33, and the compressed air can be sent to the intake manifold pipe 31a in a uniform condition.

The intake manifold 31 can be disposed behind the intercooler 33 and when viewed from the front of the engine as shown in FIG. 5, it can be invisible, covered by the intercooler 33. The supercharger 34 can be disposed between the intercooler 33 and the intake box 35 and when viewed from the right side of the engine 20 as shown in FIG. 4, it can be invisible, covered by the intercooler 33. That is, the intercooler 33 can be disposed compactly in the dead space at the corner of the engine 20 between the intake manifold 30 and the supercharger 34. Of course, it is not necessary that the intercooler 33 be invisible from any point of view.

To the engine 20 can be supplied fuel from the fuel tank 16 through a fuel supply system. This fuel supply system can be constituted by a fuel pump and a fuel injector (not shown) or the like, and fuel taken out from the fuel tank 16 by the operation of the fuel pump can be atomized by the fuel injector to be injected into the cylinder 27. The fuel can be mixed, in the intake manifold pipe 31a, with compressed air supplied from the intake box 35 through the supercharger 34 and intercooler 33 to form a mixture, and the mixture can be sent into the cylinder 27. The engine 20 can be provided with an ignition plug to be mounted in an ignition plug mounting hole 45, and the mixture can be detonated by the ignition of the ignition plug. This detonation causes the piston 26 to move up and down and the crankshaft 21 can be rotated by this movement.

The exhaust system 17 can include exhaust manifold pipes connected to the exhaust ports of the cylinders 27, respectively, an exhaust pipe 17a connected to the downstream ends of the exhaust manifold pipes, a water lock 17b connected to the downstream end of the exhaust pipe 17a and the like. However, other configurations can also be used. The exhaust system 17 can also be open at the downstream end to a casing 46 for isolating the propulsion unit 18 from the main part of the body 11 and for providing communication with the outside from the rear end of the body 11.

A pump drive shaft 47 coupled to the crankshaft 21 through a coupling 21a can extend into the pump room 15 at the rear. The pump drive shaft 47 can be coupled to an impeller (not shown) provided in the jet pump 18a and transmits the rotational force of the crankshaft 21 by the drive of the engine 20 to the impeller to rotate the impeller. The pump drive shaft 47 can be formed from one or a plurality of separate shafts connected in a known manner.

The propulsion unit 18 with the jet pump 18a can be provided with a water introduction port 46a opening at the bottom of the body 11 and a water discharge port 18b opening at the stern. As such, the propulsion unit 18 can jet out water, introduced from the water introduction port 46a, through the water discharge port 18b by the operation of the jet pump 18a, thereby producing propulsion force to the body 11. To the rear end of the jet pump 18a can be mounted a steering nozzle 48 for changing the moving direction of the small planing boat 10 to the left and right by moving its rear to the left and right according to the operation of the steering handlebars 12.

To the rear of the steering nozzle 48 can be mounted a reverse gate 49 for changing the moving direction of the small planing boat 10 by moving up and down. Further, the small planing boat 10 can be also provided with cooling piping for cooling sections of the engine 20 and exhaust system 17. Moreover, the small planing boat 10 according to this embodiment can be provided, in addition to the devices described above, with various kinds of devices required for the stable running of the small planing boat 10, such as an ECU (electric control unit) including CPUs, ROMs, RAMs and timers, an electrical equipment box for housing various kinds of electrical equipment, a starting switch and various kinds of sensors.

During operation of the watercraft 10, a driver or operator can sit on the seat 13 and turn on the starting switch to start the engine 20 so that the watercraft 10 is ready to run. Then, the driver can operate the steering handlebars 12 and control the throttle controller provided on the grip of the steering handlebars 12. These operations allow the small planing boat 10 to run at a given speed in a given direction according to the driver's operations. While the engine 20 is running, outside air is drawn into the intake box 35 through the air duct 14a and the air can then be sent from the intake box 35 to the supercharger 34.

The air sent to the supercharger 34 can be compressed, increased in temperature, and sent to the intercooler 33 with its air density lowered. The compressed air can be cooled by cooling water during passage through the intercooler 33, increased in air density, and sent to the throttle body 32 from the air duct 33a. The compressed air, with its flow rate regulated by the throttle body 32, passes through the intake manifold 31 and intake manifold pipes 31a to be supplied to the corresponding cylinders 27.

Meanwhile, the compressed air can be mixed with fuel sent from the fuel tank 16. The mixture of the air and fuel can be detonated by the ignition of the ignition plug in the cylinder 27 to drive the engine 20. The rotational force of the crankshaft 21 can be transmitted to the pump drive shaft 47 to drive the propulsion unit 18.

When the small planing boat 10 is stopped and the engine 20 is stopped as well, cooling water supply to the engine 20 and intercooler 33 is also stopped. At this time, the cooling water in the engine 20 and intercooler 33 can be discharged to the outside through the cooling water inlet 42a or the like, because the device used to supply the cooling water to the inlet 42a is no longer operating, and thus, the cooling water can then flow out through the inlet 42a. For example, where the device used for supplying cooling water to the intercooler 33 is the jet pump 18a, when the jet pump 18a is stopped, the water in the intercooler 33 can flow backwards toward the jet pump 18a and into the body of water in which the watercraft 10 is floating. In some embodiments, the intercooler 33 can be disposed such that its inlet 42a is disposed above the waterline when the watercraft 10 is floating at rest, thereby enhancing the draining effect described above.

As described above, since in the watercraft 10, the cooling water inlet 42a of the cooling water passage passing through the intercooler 33 can be disposed at the lower end of the intercooler 33, and the cooling water outlet 42b at the upper end of the intercooler 33, cooling water in the intercooler 33 can be discharged smoothly when the engine 20 is stopped. Therefore, no cooling water remains in the intercooler 33, and corrosion in the intercooler 33 can be prevented. In addition, since the intercooler 33 can be vertically long and disposed vertically along the front side of the engine 20, even if the small planing boat 10 moves up and down violently while running, no unreasonable stresses are exerted on the intercooler 33, and the intercooler 33 can be less likely to be damaged. For example, the generally vertical arrangement of the intercooler prevents the intercooler from being warped or damaged due to unreasonable stresses on the intercooler, even if the small planing boat moves up and down while running. Here, the side of the engine refers to the left, right, forward or rearward side around the engine 20.

Further, the air passage 34a connected to the discharge port 34c of the supercharger 34 can extend upwardly and its leading end can be connected to the front of the intercooler 33 at the upper part. Therefore, even if air is heated by heat produced during compression of the air by the supercharger 34, the intercooler 33 cools the heated, compressed air so that compressed air at appropriate temperature can be sent to the engine 20. As a result, the output of the engine 20 can be increased efficiently. Further, since the discharge port 34c of the supercharger 34 and the air inlet of the intercooler 33 can be disposed close to each other, the air passage 34a can be made shorter, lowering the cost required for the piping.

Additionally, since the intercooler 33 can be disposed in the dead space produced at the corner between the supercharger 34 disposed in front of the engine 20 and the intake manifold 31 provided at the side of the engine 20 at the upper part, the supercharger 34 and the intercooler 33 can be disposed compactly in the narrow engine room 14. Moreover, since the supercharger 34 and intercooler 33 can be disposed close to each other, the air passage 34a can be made further shorter.

Still further, since the intercooler 33 can be disposed in front of the engine 20 where influence of heat radiation from the engine 20 can be less, a drop in the cooling capacity of the intercooler 33 due to the heat radiation from the engine 20 can be prevented.

For example, since the intercooler 33 can be disposed forward of the engine 20, instead of laterally beside the engine 20, influence of the heat radiation from the engine 20 can be made smaller. That is, since the intercooler 33 is disposed at a position other than the left or the right side of the engine 20, a drop in the cooling capacity of the intercooler 33 due to heat radiation of the engine 20 can be prevented. The same cooling capacity is also achieved if the supercharger 34 and the intercooler 33 are disposed to the rear of the engine.

Further, since the intercooler 33 can be of a two-pass type, the intercooler 33 can be downsized while securing a proper cooling efficiency. For example, the air passage provided generally vertically in the intercooler 33 crosses the cooling water passage provided generally vertically in the intercooler 33 once and then crosses it again from the opposite direction, due to the division defined by the wall 44. With this arrangement, the intercooler 33 can be downsized while securing a proper cooling efficiency.

The various embodiments of the watercraft 10 described herein is not limited to those foregoing embodiments. Rather, the device or vehicle using the inventions disclosed herein can be changed as appropriate for implementation.

For example, in at least some of the foregoing embodiments, the cooling water inlet 42a of the intercooler 33 is disposed lower than the cooling water outlet 42b. However, this arrangement can be reversed, with the cooling water inlet 42a disposed above the cooling water outlet 42b. In this configuration, when the engine 20 is stopped, any water in the intercooler 33 can still drain out of the intercooler 33.

Further, in some embodiments, the air passage 34a can be connected to the intercooler 33 at the lower part, and the air duct 33a to the intercooler 33 at the upper part. In this case, it is preferable that the discharge port 34c of the supercharger 34 can be directed downwardly and the air passage 34a extends downwardly.

This can provide additional benefits. For example, to endure the pressure of the air compressed by a compressor, a pipe located downstream of a compressor for connecting the compressor and an intercooler requires a high durability. Thus, in the watercraft 10, if the discharge port 34c of the supercharger 34 is directed upwardly, the air inlet of the intercooler 33 can be provided at the upper part of the intercooler 33 and if the discharge port 34c of the supercharger 34 is directed downwardly, the air inlet of the intercooler 33 can be provided at the lower part of the intercooler 33. Therefore, the discharge port 34c of the compressor and the air inlet of the intercooler 33 can be disposed close to each other and the pipe for connecting the compressor and the intercooler can be made shorter. As a result, the cost required for a pipe made from a thick member or a reinforced member and the like with high durability can be decreased. As used in this description, the upper part of the intercooler 33 refers to a region in the upper part including its upper end, and the lower part of the intercooler a region in the lower part including its lower end.

Further, although in at least some of the foregoing embodiments, the compressor can be constituted by a supercharger 34 utilizing the drive force of the engine 20, a turbocharger utilizing combustion gas may be used in place of the supercharger 34. Furthermore, although in at least some of the foregoing embodiments, the intercooler 33 and supercharger 34 are disposed in front of the engine 20, the intercooler 33 and supercharger 34 can be disposed behind the engine 20 instead of in front. Moreover, although in at least some of the foregoing embodiments, the intercooler can be a two-pass type intercooler 33, an intercooler of three-pass type, more-than-three pass type or one-pass type may also be used. Still further, arrangements or structures and the like of other sections constituting the small planing boat may be changed as appropriate within the technical scope of the inventions disclosed herein.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A small planing boat comprising a hull, an engine supported by the hull and connected to an intake passage configured to introduce air into the engine, an exhaust passage configured to guide exhaust gas away from the engine, a crankshaft disposed so as to extend generally in a longitudinal direction of the hull, and an intercooler configured to cool air to be supplied to the engine with cooling water, the intercooler including an upper end, a lower end, an internal air passage, a cooling water passage configured to guide cooling water into thermal communication with the air passage, at least one cooling water inlet, and at least one cooling water outlet, wherein either the at least one cooling water inlet is disposed at the upper end and the cooling water outlet is disposed at the lower end or the cooling water inlet is disposed at the lower end and the cooling water outlet is disposed at the upper end, a compressor configured to compress air and to supply the compressed air to the intercooler, the compressor having a compressed air discharge port directed approximately parallel to a center axis of a cylinder provided in the engine, either one of the air inlet and the air outlet of the air passage is disposed at the upper part of the intercooler and the other at the lower part of the intercooler, and if the discharge port of the compressor is directed upwardly, the air inlet of the intercooler is disposed at the upper part of the intercooler and if the discharge port of the compressor is directed downwardly, the air inlet of the intercooler is disposed at the lower part of the intercooler.

2. The small planing boat according to claim 1, wherein the intercooler is disposed along a side of the engine, with a longitudinal direction of the intercooler oriented generally vertically.

3. The small planing boat according to claim 1, wherein the intercooler, the compressor and an intake manifold form the intake passage and are disposed such that when viewed from a direction perpendicular to a rotational axis of the crankshaft and perpendicular to the center axis of the cylinder, the intercooler and the compressor overlap each other at least partly and when viewed from the rotational axis of the crankshaft, the intercooler and the intake manifold overlap each other at least partly.

4. The small planing boat according to claim 2, wherein the intercooler, the compressor and an intake manifold form the intake passage and are disposed such that when viewed from a direction perpendicular to a rotational axis of the crankshaft and perpendicular to the center axis of the cylinder, the intercooler and the compressor overlap each other at least partly and when viewed from the rotational axis of the crankshaft, the intercooler and the intake manifold overlap each other at least partly.

5. The small planing boat according to claim 1, wherein the intercooler is a two-pass type of intercooler.

6. The small planing boat according to claim 2, wherein the intercooler is a two-pass type of intercooler.

7. The small planing boat according to claim 3, wherein the intercooler is a two-pass type of intercooler.

8. The small planing boat according to claim 4, wherein the intercooler is a two-pass type of intercooler.

9. The small planing boat according to claim 1 additionally comprising a cooling water supply device configured to supply cooling water to the inlet of the intercooler during operation of the watercraft, the cooling water supply device being configured to allow cooling water to drain from the cooling water inlet when the engine is not operating.

* * * * *